N. N. GOGOTZKY.
AUTOMATIC REGULATOR FOR GAS FURNACES.
APPLICATION FILED JUNE 21, 1912.

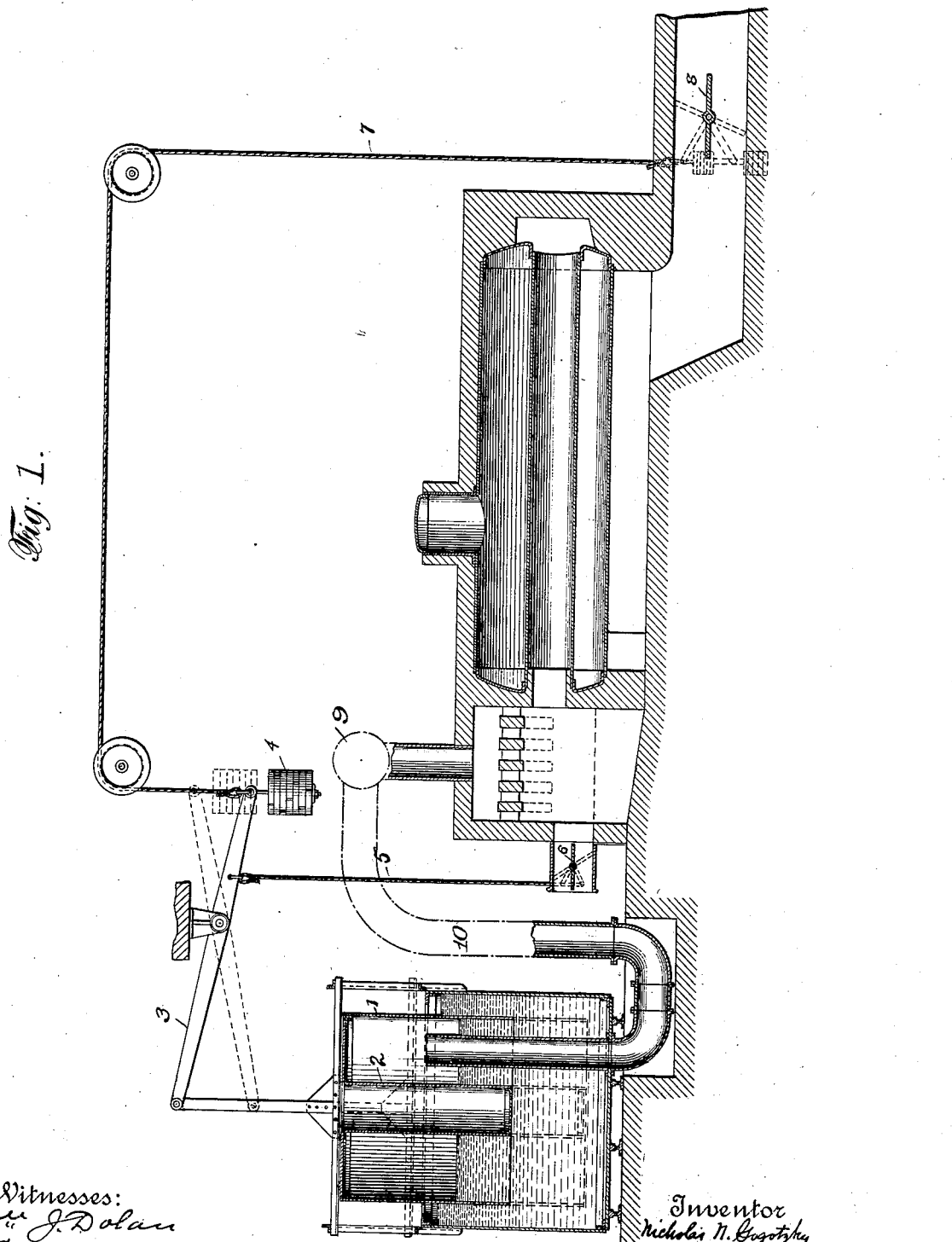

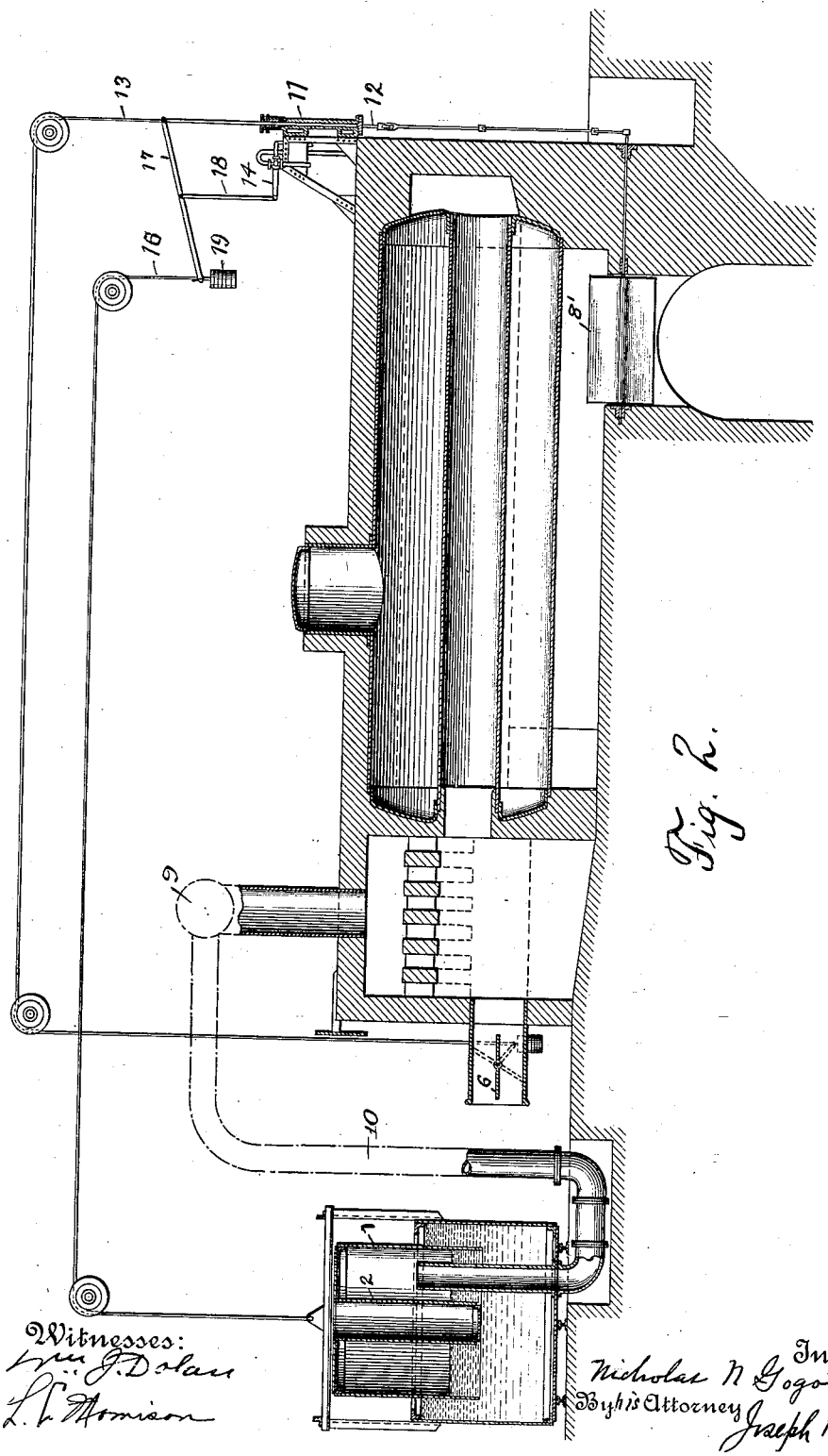

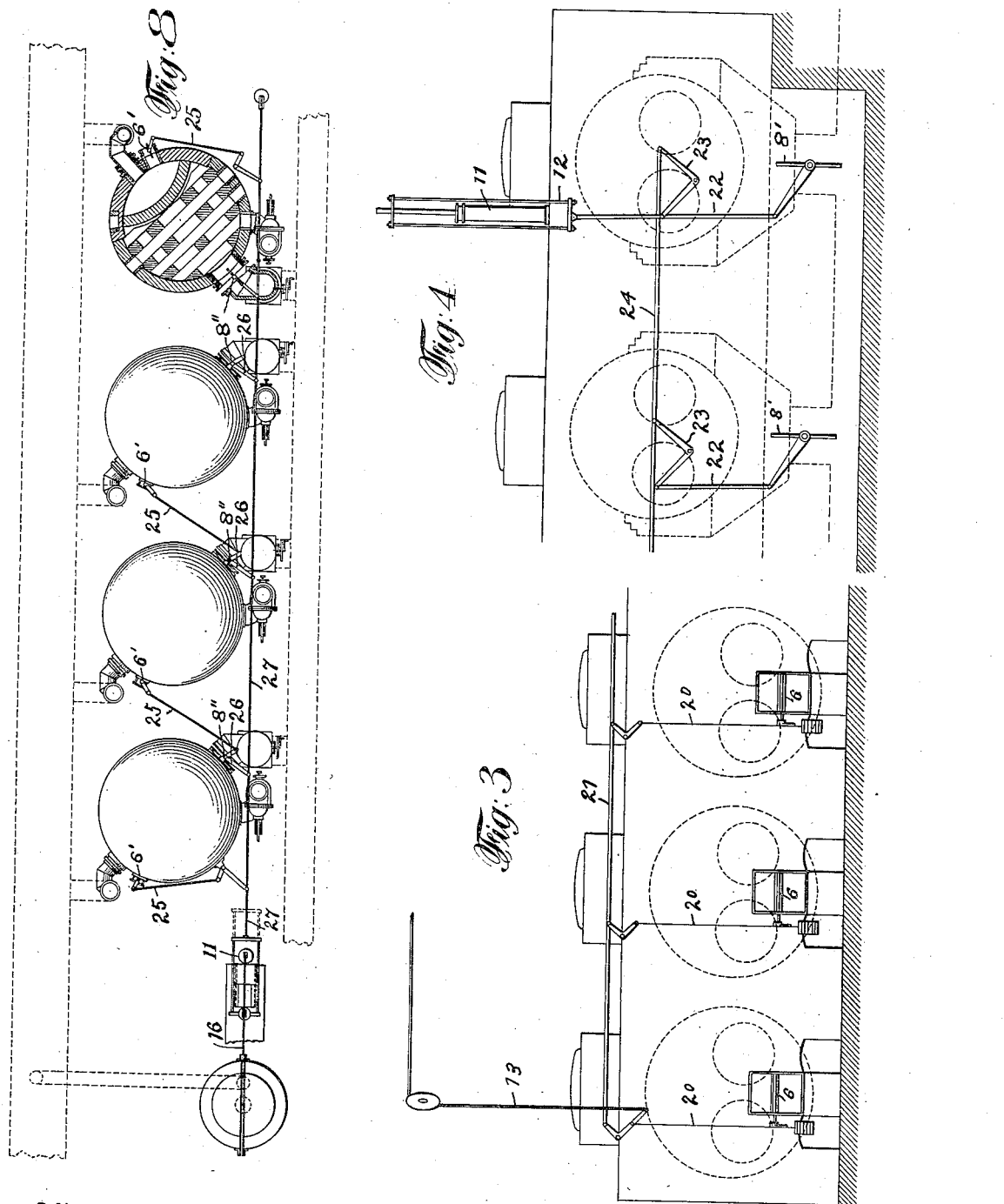

1,177,317.

Patented Mar. 28, 1916.
5 SHEETS—SHEET 4.

Witnesses:
Wm J. Dolan
L. C. Morrison

Inventor
Nicholas N. Gogotzky
By his Attorney
Joseph H. Freeman

N. N. GOGOTZKY.
AUTOMATIC REGULATOR FOR GAS FURNACES.
APPLICATION FILED JUNE 21, 1912.
1,177,317.
Patented Mar. 28, 1916.
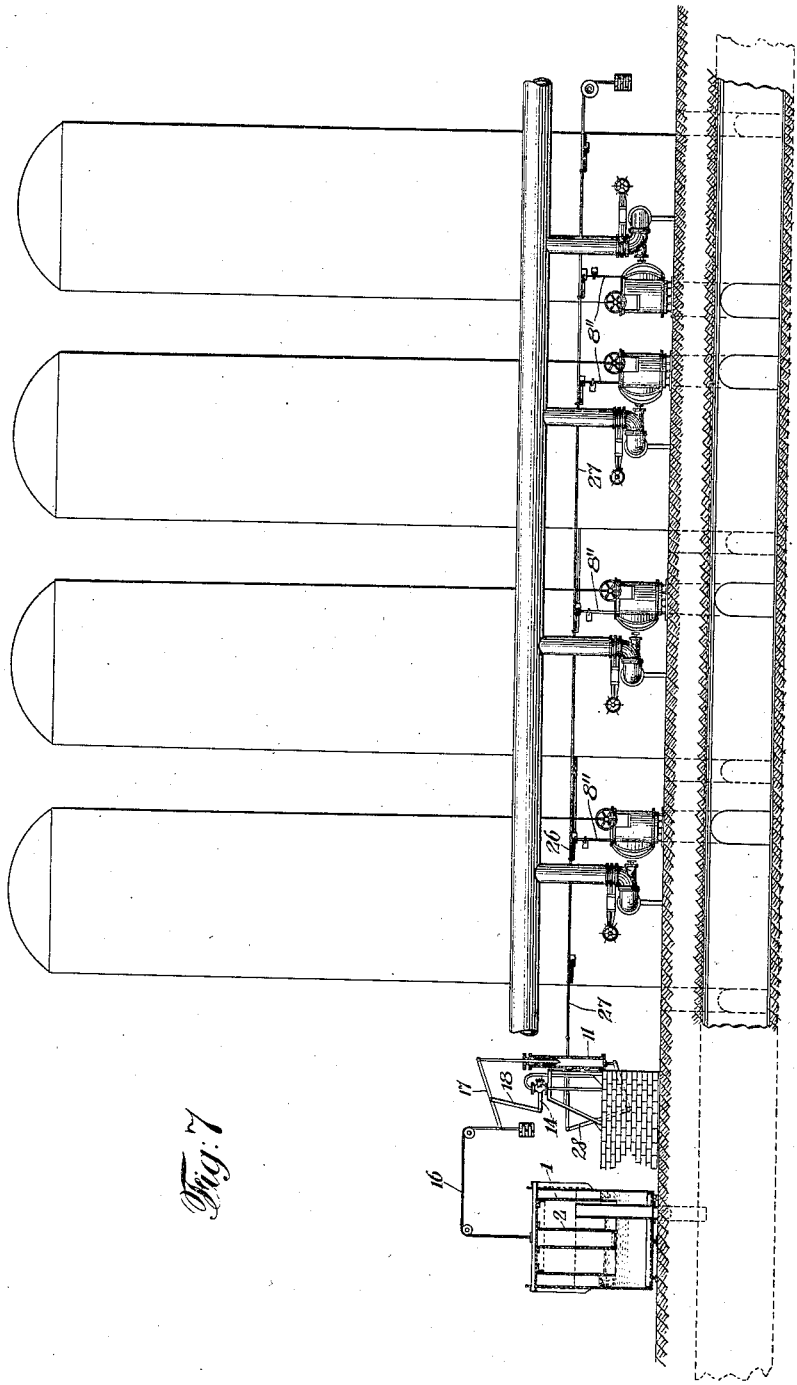

UNITED STATES PATENT OFFICE.

NICHOLAS N. GOGOTZKY, OF EKATERINOSLAW, RUSSIA.

AUTOMATIC REGULATOR FOR GAS-FURNACES.

1,177,317.     Specification of Letters Patent.     Patented Mar. 28, 1916.

Application filed June 21, 1912. Serial No. 705,094.

*To all whom it may concern:*

Be it known that I, NICHOLAS N. GOGOTZKY, a subject of the Czar of Russia, and a resident of Ekaterinoslaw, Russia, have invented certain new and useful Improvements in Automatic Regulators for Gas-Furnaces, of which the following is a specification.

The purpose of this invention is to automatically regulate the supply of air to furnaces in which is burned gas derived from blast furnaces, the regulation being effected in such manner that the excess of air shall be normal, that is to say, correspond to the complete and most economical combustion of the gas notwithstanding the unavoidable variations of its pressure.

Considerable difficulty has been experienced with furnaces of steam boilers and hot blast apparatus fed by the gas of blast furnaces because the latter, only being a by-product, is supplied irregularly according to the manner in which these blast furnaces are operated. The changes of the quantity, and hence the pressure of gas coming from blast furnaces, are so sudden and frequent that, with no automatic regulation or with hand adjustment, the combustion is inevitably effected either with excess of air or with excess of gas, and accordingly either with loss of unburned gas or with loss of heat carried off by the exaggerated excess of air. The construction of a gasometer adapted to supply the gas at a substantially uniform pressure would be embarrassing because it would necessarily have extraordinary dimensions to accommodate the prodigious quantity of gas yielded by modern blast furnaces.

In accordance with the present invention, the regulation of the air supply is effected by the employment of a relatively small gas bell controlling the movements of suitable valves, with or without any intermediate mechanism.

In the most complete form of apparatus by which the invention has been carried into effect the supply of air is regulated by both inlet and draft controlling valves actuated by a motor which in turn is controlled by the variations of gas pressure.

The invention consists in the novel improvements, parts and combinations of parts herein shown and described.

The drawings referred to herein and forming a part hereof illustrate several embodiments of the invention and serve in connection with the description herein to explain the principles of the invention.

Figure 5:
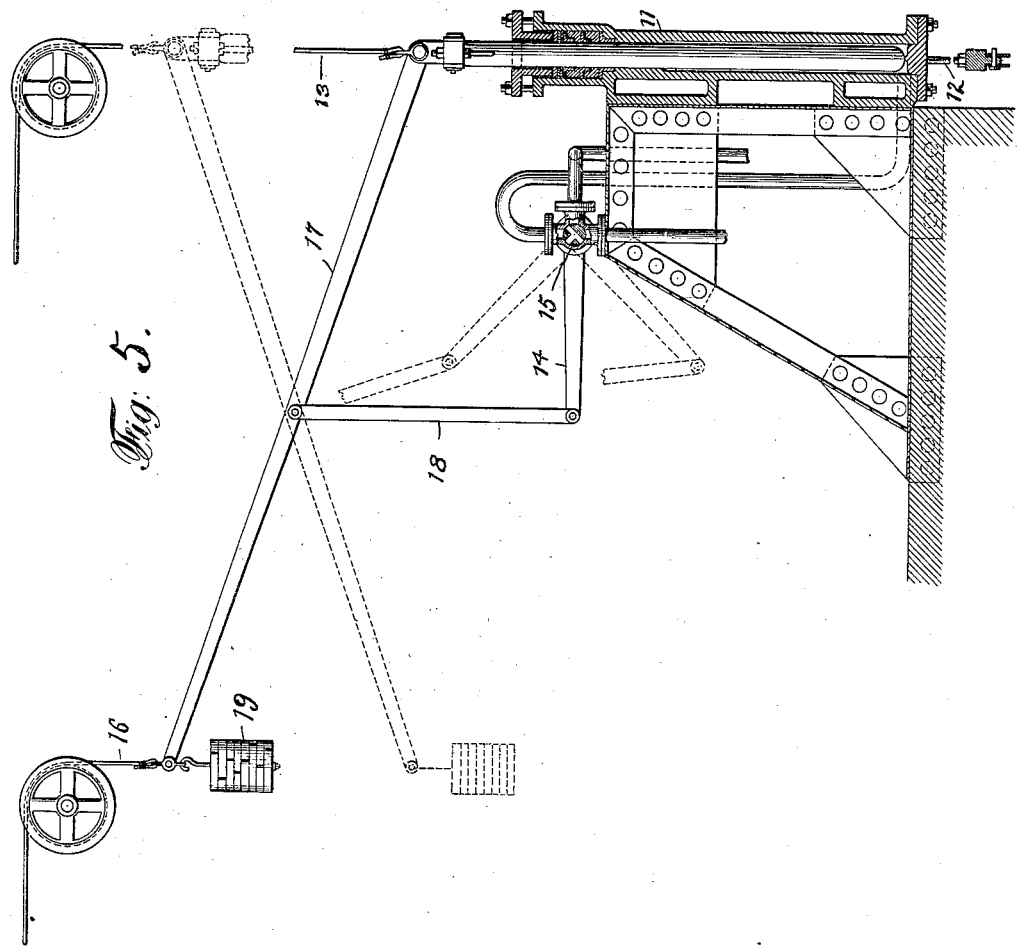
Figure 6:
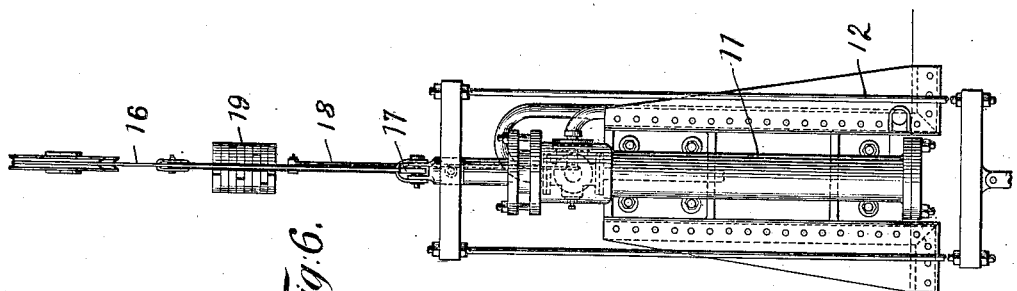

Of the drawings: Figure 1 is a sectional, diagrammatic view, illustrating one manner of carrying the invention into effect; Fig. 2 is a similar view, illustrating another embodiment of the invention; Fig. 3 is an end elevation, illustrating an application of the apparatus shown in Fig. 2 to a number of furnaces; Fig. 4 is an elevation of the opposite end of the apparatus shown in Fig. 3; Figs. 5 and 6 are respectively a side elevation, partly in section, and an end elevation of one of the details of the embodiment shown in Fig. 2; and Figs. 7 and 8 are respectively a plan view and end elevation, partly in section, of an embodiment of the invention as applied to hot blast apparatus.

The apparatus illustrated in Fig. 1 comprises a small gas bell 1, provided with a buoyant member 2 and lever 3, with counterweights 4, so calculated that the positions of equilibrium correspond substantially to the variations of pressure in the conduit 9 conducting the gas to the furnace. A gas pressure pipe 10 connects the conduit with the interior of the bell.

The lever 3 is connected with an air-valve inlet 6 and a draft valve 8 by two cables 5 and 7, respectively, and operates in such manner that when the pressure of the gas in the main 9 is zero, both valves are closed; and on the contrary, when there is a pressure of gas, the valves are opened far enough to permit the admission of the air with a normal excess. The greater the pressure the higher the bell lifts and the farther the valves 6 and 8 open.

The extreme positions of the valves and the lengths of the cables are determined according to the analyses of the burnt products in order that in the intermediate positions the excess of air shall be favorable to the most economical combustion of the gas.

In the case of a number of furnaces, either for a battery of steam boilers or for a series of hot blast apparatus, where there would necessarily be several valves to be controlled, the force of the small gas bell might not be sufficient to actuate the valves or their equivalents. In that case the movements of the gas bell are employed to operate the distributing member of a suitable motor, hydraulic, steam, compressed air, electric, etc. For the sake of example, one of these motors is shown in detail in Figs. 5 and 6, the same being shown as applied to a single boiler in Fig. 2, to a battery of steam boilers in Figs. 3, and 4, and to hot blast apparatus in Figs. 7 and 8. As shown, this motor comprises a hydraulic cylinder 11 having its plunger connected with the valves 6 and 8 by means of a cable 13 and a rod 12, respectively. Water under pressure is admitted to, and cut off and discharged from, the cylinder 11 to control the movements of the plunger, by means of a three-way valve 15, the arm 14 of which is connected by a link 18 with a lever 17 connected at one end directly to the plunger and at the other end to the gas bell by a cable 16 provided with counterweights 19.

When the arm 14 of the valve 15 is horizontal, the water is cut off from the hydraulic cylinder and its plunger. It will be seen that any movement of the gas bell will move the three-way valve 15 either to admit water to or discharge it from the hydraulic cylinder, depending upon the direction of the motion, and that this will result in a corresponding degree of movement of the plunger which will restore the valve to its normal position. By reason of this construction, the gas bell has to overcome only the slight resistance of the valve 15, the valves 6 and 8 being moved by the plunger which may be made as powerful as desired by properly determining its area and the pressure of the water. While the plunger is shown as single-acting, i. e., as being moved in one direction by the water and in the other direction by its own weight together with the net weight of the connected parts, it is obvious that a double acting piston may be employed if desired.

Fig. 3 represents the front of a battery of boilers, showing the air valves 6 each connected by a rod or cable 20 and bellcrank with a rod 21 which in turn is connected through one of the bellcranks with the cable 13.

Fig. 4 represents the same series of steam boilers from the sides of the draft valves and shows these valves coupled to each other and to the rod 12 of the hydraulic cylinder by links 22, bellcranks 23 and rod 24.

Figs. 6 and 7 show a plan view and elevation of an installation of hot blast apparatus equipped with the hydraulic motor system of control for the air inlet valves 6' and the draft valves 8' which are connected respectively by links 25 and bellcranks 26 with a rod or cable 27 which in turn connects through a lever 28 with the plunger of the motor.

As an improvement, it is pointed out that, to secure the best results under all conditions and at the same time to facilitate the operator's work as far as possible, the gas admission valves of the furnaces may be automatically controlled by means like or similar to the means herein shown and described for controlling the air and the draft.

In its broader aspects the invention is not limited to the particular constructions herein shown and described, as many changes may be made without departing from the main principles of the invention or sacrificing its chief advantages.

I claim:

1. A self-regulating furnace for burning gas supplied from a naturally fluctuating source, the same including in combination, the furnace walls within which the mixing and combustion takes place, a gas inlet thereto from the fluctuating source, an air inlet for atmospheric air under natural pressure, a draft outlet, an air valve device in said air inlet for varying the air inflow by restriction of said inlet, a movable regulator actuated by pressure fluctuations in the gas supply source, and connections whereby the movements of said regulator control the adjustment of said air valve device so as to automatically vary the air inflow quantitatively in accordance with the gas inflow.

2. A self-regulating furnace for burning gas supplied from a naturally fluctuating source, the same including, in combination, the furnace walls within which the mixing and combustion takes place, a gas inlet thereto from the fluctuating source, an air inlet for atmospheric air under natural pressure, a draft outlet, an air valve device in said air inlet for varying the air inflow by restriction of said inlet, a draft valve device for varying the draft outflow, a movable regulator actuated by pressure fluctuations in the gas supply source, and connections whereby the movements of said regulator control the adjustment of both said valve device so as to automatically vary both the air inflow and the draft outflow in harmony with fluctuations in the gas inflow.

3. A self-regulating mechanism for a plurality of furnaces for burning gas supplied from a naturally fluctuating source, the same including, in combination, a plurality of furnaces within which the mixing and combustion takes place, a gas inlet to each furnace from the fluctuating source, an air inlet to each furnace for atmospheric air under natural pressure, a draft outlet from each furnace, a plurality of air valve devices one located in each of said air inlets for varying the air inflow to each furnace, a movable regulator actuated by pressure fluctuations in the gas supply source and connections whereby the movements of said regulator control the adjustment of all of said air valve devices so as to automatically vary the air inflow to all of said furnaces quantitatively in accordance with the gas inflow.

4. A self-regulating mechanism for a plurality of furnaces for burning gas supplied from a naturally fluctuating source, the same including, in combination, a plurality of furnaces within which the mixing and combustion takes place, a gas inlet to each furnace from the fluctuating source, an air inlet to each furnace for atmospheric air under natural pressure, a draft outlet from each furnace, a plurality of air valve devices one located in each of said air inlets for varying the air inflow to each furnace, a movable regulator actuated by pressure fluctuations in the gas supply source, and connections, including a single valve adjusting motor, whereby the movements of said regulator control all of said air valve devices so as to automatically vary the air inflow to all of said furnaces quantitatively in accordance with the gas inflow.

5. A self-regulating mechanism for a plurality of furnaces for burning gas supplied from a naturally fluctuating source, the same including, in combination, a plurality of furnaces within which the mixing and combustion takes place, a gas inlet to each furnace from the fluctuating source, an air inlet to each furnace for atmospheric air under natural pressure, a draft outlet from each furnace, a plurality of air valve devices one located in each of said air inlets for varying the air inflow to each furnace, a plurality of draft valve devices one for varying the draft outflow of each furnace, a movable regulator actuated by pressure fluctuations in the gas supply source, and connections whereby the movements of said regulator control all of said valve devices so as to automatically vary both the air inflow to and the draft outflow from all of said furnaces quantitatively in accordance with the gas inflow.

In testimony whereof I have signed my name to this specification in the presence of two subscribing witnesses.

NICHOLAS N. GOGOTZKY.

Witnesses:
ANDRÉ M. BAUCHTEIEFF,
A. W. SMITH.